(12) United States Patent
Dietrich

(10) Patent No.: US 6,623,215 B2
(45) Date of Patent: Sep. 23, 2003

(54) APPARATUS AND METHOD OF PNEUMATICALLY CONVEYING POWDER SUBSTANCES AND USE OF THE APPARATUS

(76) Inventor: Frederic Dietrich, 44 Chemin Maison Jean, CH-1801 Le Mont Pelerin VD (CH)

(*) Notice: Subject to any disclaimer, the term of this patent is extended or adjusted under 35 U.S.C. 154(b) by 0 days.

(21) Appl. No.: 10/264,177

(22) Filed: Oct. 3, 2002

(65) Prior Publication Data

US 2003/0035692 A1 Feb. 20, 2003

Related U.S. Application Data

(62) Division of application No. 09/730,956, filed on Dec. 6, 2000.

(30) Foreign Application Priority Data

Dec. 10, 1999 (DE) .......................................... 199 59 473

(51) Int. Cl.[7] ................................................ B65G 53/00
(52) U.S. Cl. ...................................................... 406/197
(58) Field of Search ................................. 406/196, 197, 406/13, 73, 85, 151; 222/334

(56) References Cited

U.S. PATENT DOCUMENTS 2,536,300 A * 1/1951 Martin .......................... 141/61
3,932,065 A * 1/1976 Ginsberg et al. ............ 417/317

* cited by examiner

Primary Examiner—Joseph A. Dillon
(74) Attorney, Agent, or Firm—Bachman & LaPointe, P.C.

(57) ABSTRACT

An apparatus for pneumatically conveying powder substances in a pipe system, wherein a volume is sucked in with reduced pressure and discharged with increased pressure for being passed further along, characterized in that the apparatus has within the pipe system at least one metering chamber which can be alternately filled and emptied by way of control member for metering the powder substance.

11 Claims, 3 Drawing Sheets

Figure 1:
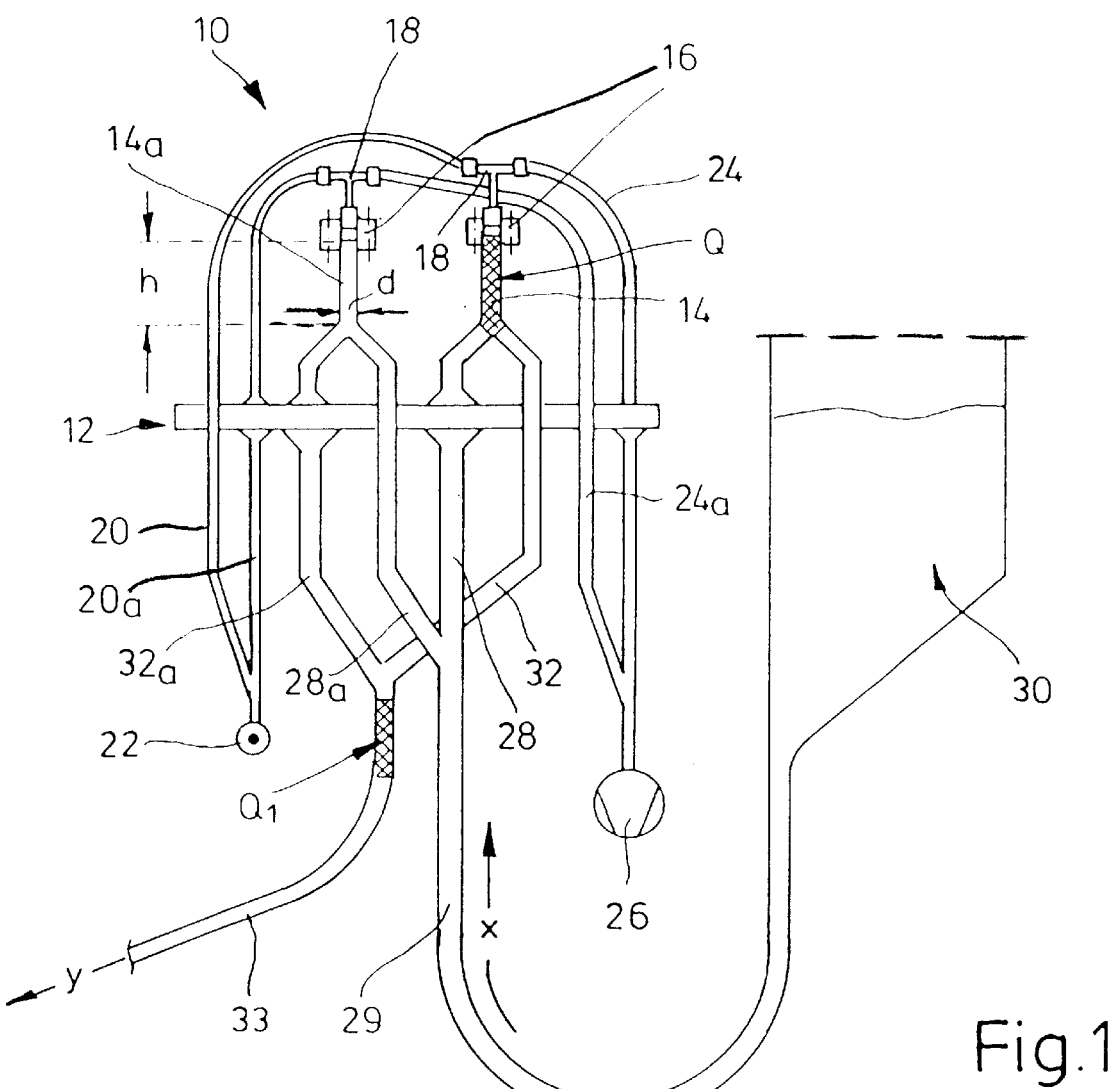

APPARATUS AND METHOD OF PNEUMATICALLY CONVEYING POWDER SUBSTANCES AND USE OF THE APPARATUS

This is a Division, of application Ser. No. 09/730,956 filed Dec. 6, 2000.

The invention concerns an apparatus for and a method of pneumatically conveying powder substances—possibly with the use of at least one filter—in a pipe system, wherein the substance is sucked in with a reduced pressure and a given volume is discharged with an increased pressure to be passed further along. The invention also concerns the use of that apparatus and/or that method.

An apparatus and a method of that kind are known from WO 98 17 558 to the present inventor. EP-A-0 574 596 also describes an installation for pneumatically transloading cement from ships into silos by means of a so-called lock-type container comprising a plurality of container segments; disposed in the uppermost container segment is an exhaust air filter while the lowermost container segment tapers in a funnel-like configuration.

In consideration of those factors the inventor set himself the aim of increasing the degree of accuracy of continuous metering in inexpensive conveyance of powder substances.

That object is attained by the teaching set forth in the independent claims; the appendant claims set forth advantageous developments. The scope of the invention also embraces all combinations of at least two of the features disclosed in the description, the drawing and/or the claims.

In accordance with the invention, within the pipe system, the apparatus has at least one metering chamber which can be filled and emptied alternately by way of a control unit. In addition it has proven to be advantageous to connect to the metering chamber on the one hand a gas pressure conduit and a suction conduit and on the other hand a feed conduit and a discharge conduit; the gas pressure conduit and the suction conduit are preferably connected with the interposition of a filter in order to prevent the ingress of substances being conveyed.

In accordance with a further feature of the invention the metering chamber is of a diameter of between 0.5 and 100 mm, preferably between 1 and 80 mm, while the length thereof is between 5 and 30 times, advantageously between 10 and 20 times, the diameter.

In addition at least one control unit is to be associated with the conduits of the pipe system; at least in the region of the control unit the conduits are to be of a variable cross-section and in particular are to be elastically deformable.

By way of example the control unit may be provided with two linear abutment regions which extend at a spacing relative to each other and with which are associated conduits which are deformable in cross-section and which can be applied alternately. Desirably, for that purpose, abutment regions are in the form of sides of a control frame.

The invention also provides that at least one pressure-generating element—for example a control piston—is movably mounted in the control frame and near the abutment regions or frame sides is provided with clamping bars or the like pressure members which, to deform the conduit cross-sections, are moved against same.

In another embodiment the control unit has an abutment region for pressure-generating elements—in particular control pistons—, with each of which is associated a pair of conduits.

The invention also provides a cam disk or cam shaft whose cam, during the rotation thereof, actuates metering valves which project into the path of movement.

In accordance with the invention, a continuous metering action of substantially higher accuracy is achieved as it is implemented by means of a plurality of small and accurately matched partial metering steps. The apparatus in accordance with the invention not only permits metering of a given amount but also affords the possibility of feeding a given amount of a product in powder form to a consumer, in a constant unit in respect of time. In order to be able to carry out such a metering procedure which is a pulsed procedure or which comprises a plurality of quantums, an accurately operating control system is of particular significance.

The method according to the invention is distinguished in that at least one metering chamber which is disposed within the pipe system 111 is alternately filled and emptied by way of a control unit. In addition the control action is to be effected by closing the suction conduit and the gas pressure conduit, in particular by clamping off feed hoses for vacuum and increased pressure.

A reduced pressure of between 10 and 600 mbar—preferably between 20 and 500 mbar—has proven to be advantageous, and an increased pressure of between 01 and 6 bars, preferably between 02 and 5 bars, has proven to be advantageous.

In accordance with the invention, with the control pulse for a piston of the control unit, all the deformable feed and discharge conduits which are to be controlled are closed in very short control pulse times; advantageously, control pulses for sucking in and ejecting the powder product are of a frequency of between 0.1 and 5 seconds, preferably between 0.2 and 4 seconds.

To protect the metering zone, the powder material may also be conveyed under protective gas.

All in all there is here an invention which can attain in a brilliant manner the object seen by the inventor, in particular for conveying powder materials, including metal substances of that kind.

Figure 2:
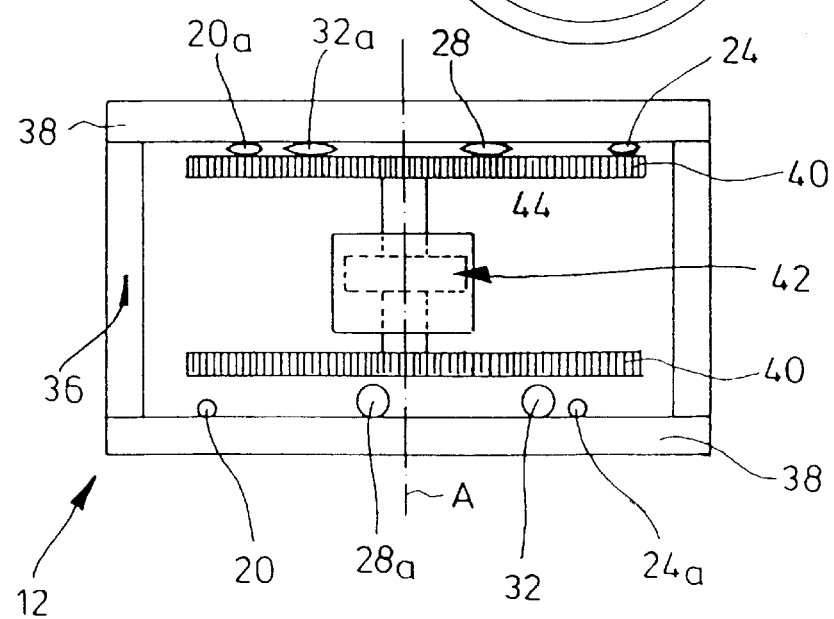
Figure 3:
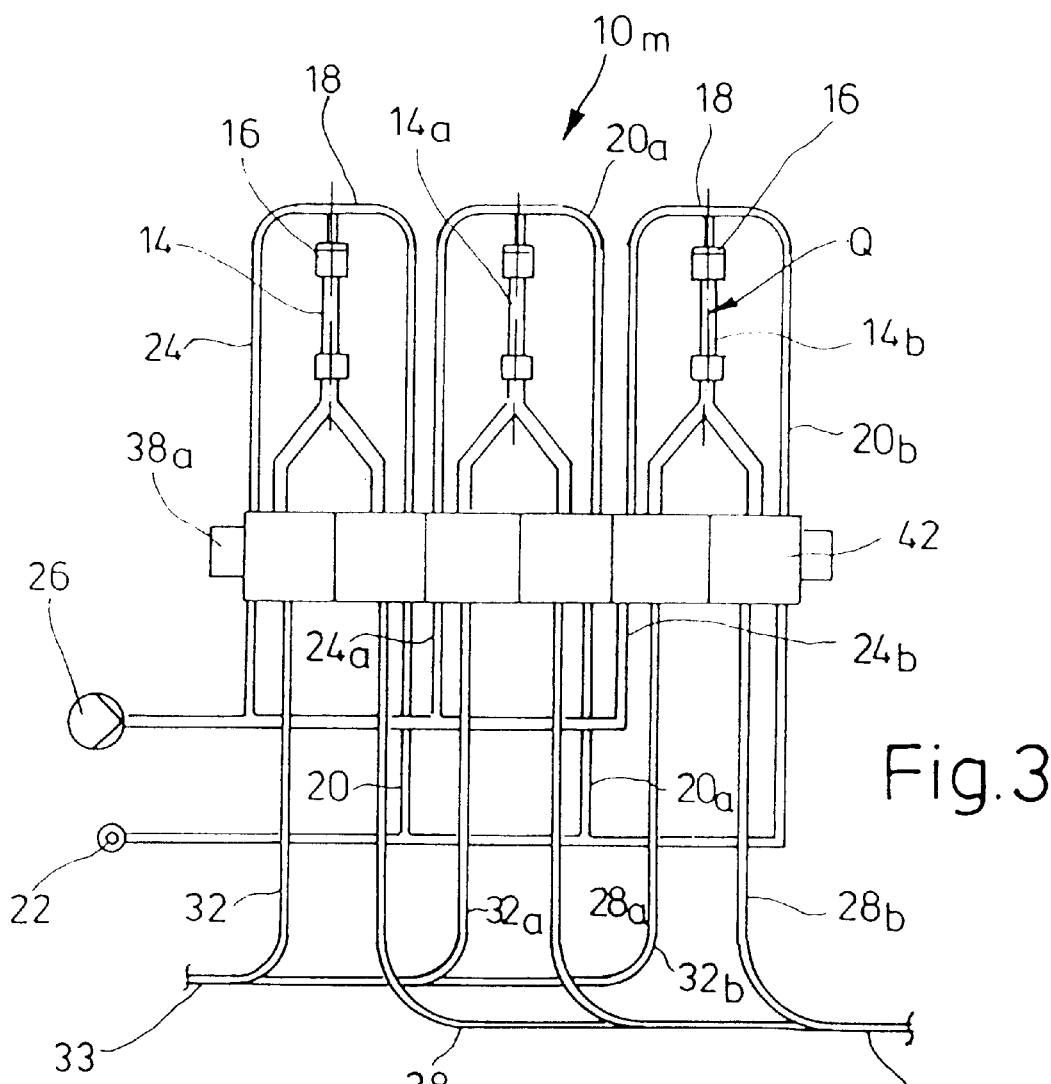
Figure 4:
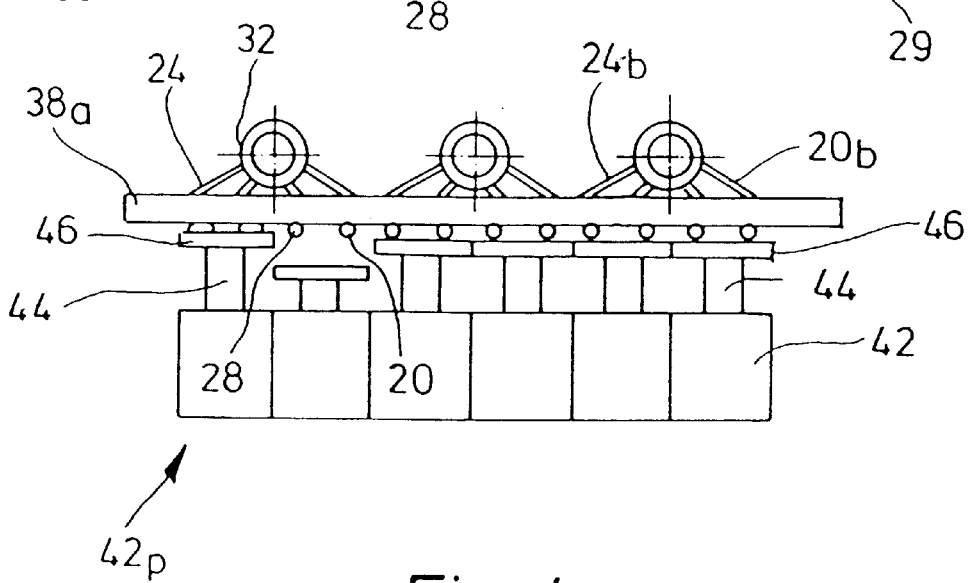
Figure 5:
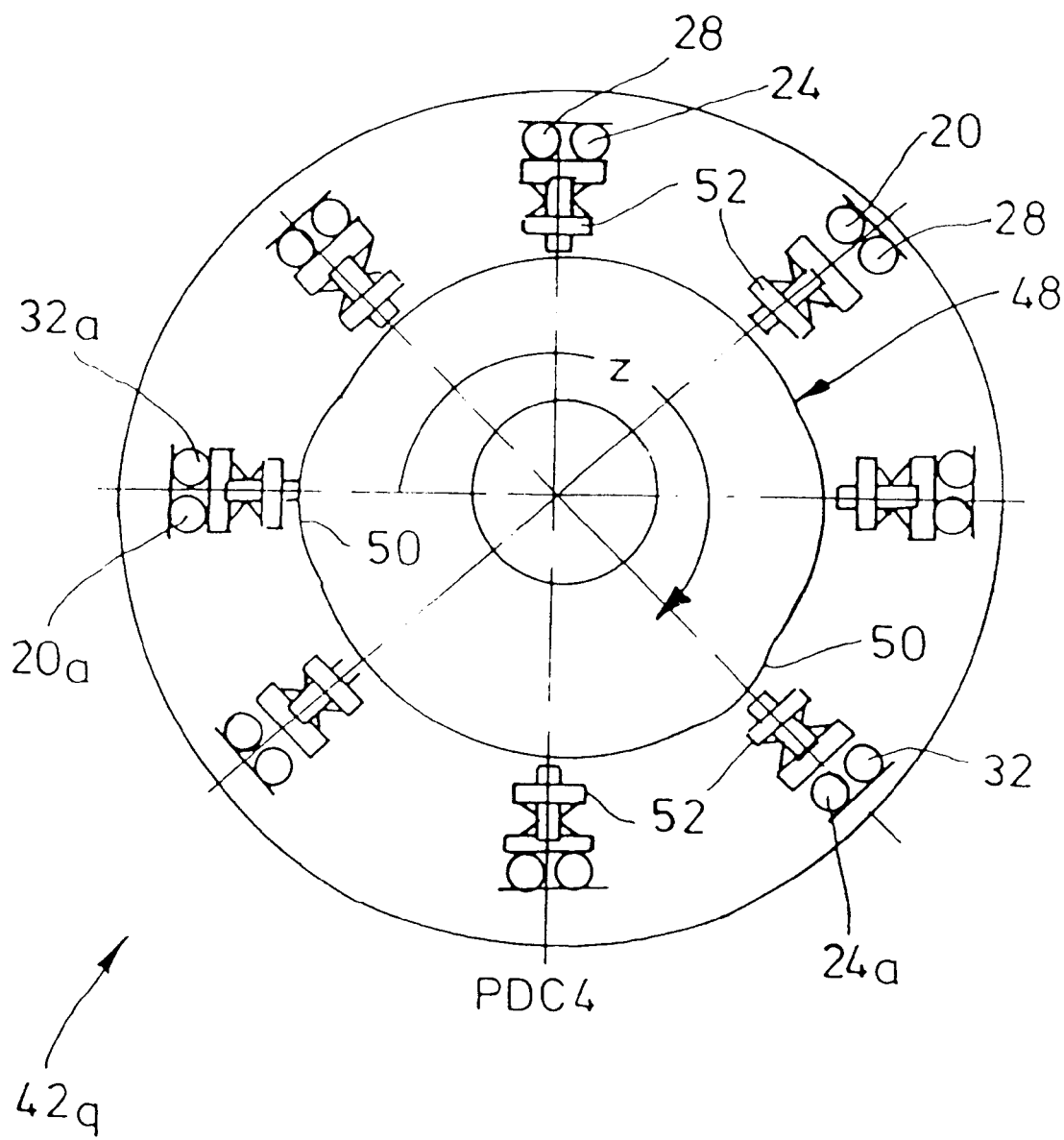

Further advantages, features and details of the invention are apparent from the description hereinafter of preferred embodiments and with reference to the diagrammatic drawings in which:

FIG. 1 is a side view of an apparatus with two metering chambers for metering powder substances, FIGS. 2 and 4 each show a control unit of the apparatus shown in FIG. 1 and FIG. 3 respectively, FIG. 3 is a side view of a modular metering apparatus with three metering chambers, and FIG. 5 is a plan view of a further control unit.

An apparatus 10 for the volumetric metering of powder substances—for example metallic, non-metallic and chemical products in a grain size range of between 0.1 and 300 $\mu$m—has as shown in FIG. 1 above a horizontal control device 12 two metering chambers 14, $14_a$ which are each connected by way of a gas pressure conduit 20, $20_a$ to a pressure gas feed conduit 22 by way of a T-shaped head pipe 18, with the interposition of a separating filter membrane 16. The head pipe 18—and therewith the metering chambers 14 and $14_a$ respectively—is on the other hand connected by a suction conduit 24, $24_a$ to a vacuum pump 26. Each filter membrane 16 forms a gas-permeable filter in order to prevent unwanted ingress of the powder substance into the conduits 20, 24 and $20_a$, $24_a$ respectively. The drawing does not show a vibration device which is associated with the apparatus, for producing a continuous flow of powder.

Extending from the foot of each of the tubular, vertically disposed metering chambers 14 and $14_a$ are two respective conduits, more specifically a feed conduit 28, $28_a$ for the powder material coming from a powder container 30, and a discharge conduit 32 and 32$_a$ respectively, intended for the powder substance. Both the two feed conduits 28, 28$_a$ and also the two discharge conduits 32, 32$_a$ are brought together at a small spacing relative to their metering chambers 14, 14$_a$ to form a common feed conveyor pipe 29 and a discharge pipe 33 respectively. The same applies in regard to the gas pressure conduits 20, 20$_a$ and the suction conduits 24, 24$_a$; they open into each other near the pressure gas conduit 22 and the vacuum pump 26 respectively.

Q denotes the powder substance in the metering chamber 14 which is at the right in FIG. 1 and which is shown in the closed condition; at the same time the other metering chamber 14$_a$ is opened. Indicated beneath the location at which the two discharge conduits 32, 32$_a$ come together, at Q$_1$ in the discharge pipe 33, is a metered quantum or amount of the powder substance.

The powder substance is drawn in by the vacuum pump 26 in the direction indicated by the arrow x by way of the suction conduit 24$_a$ from the powder container 30 into the opened metering chamber 14$_a$ and at the same time the metered amount of the powder substance Q is urged from the other metering chamber 14 by the increased pressure in the pressure gas conduit 22 into the discharge pipe 33 (discharge direction y).

Control of the apparatus 10 is effected in the region of the above-mentioned control device 12 which includes a control frame 36 within which, at one side 38 thereof, the conduits 20, 32, 24$_a$, 28$_a$ with opened cross-section and at the other side the conduits 20$_a$, 32$_a$, 24, 28 of closed cross-section are diagrammatically shown; the latter are pressed or squeezed against the associated frame side 38 by a clamping bar 40, which comprises steel, of a control member 42, with a temporary deformation in respect of cross-section. The clamping bar 40 can also be seen in FIG. 2. The synchronous movement of the clamping bars 40 is effected by means of a control piston 44 of the control member 42 in the direction of the piston axis A thereof, the control piston 44 being controlled by way of a gaseous medium such as compressed air, nitrogen or the like.

The modular metering apparatus 10$_m$ shown in FIGS. 3 and 4 has three metering chambers 14, 14$_a$, 14$_b$ which are each connected in the described manner to gas pressure conduits 20, 20$_a$, 20$_b$, suction conduits 24, 24$_a$, 24$_b$, feed conduits 28, 28$_a$, 28$_b$ and discharge conduits 32, 32$_a$, 32$_b$.

To control the metering apparatus 10$_m$, in its control member 42$_p$ a respective pressure plate 46 of one of six control pistons 44 or the like pressure-generating elements is respectively associated with a pair of conduits 24, 32; 28, 20; 24$_a$, 32$_a$; 28$_a$, 24$_b$, 32$_b$; 28$_b$, 20$_b$. In FIG. 4 by way of example the suction conduit 24 which comprises elastic material and the discharge conduit 32 of the metering chamber 14 are moved against a pressure beam 38$_a$ and temporarily deformed in cross-section, whereas the gas pressure conduit 20 and the feed conduit 28 which are also elastic in respect of cross-section are opened.

A control member 42$_q$ as shown in FIG. 5 has a cam disk or cam shaft 48 which rotates in the direction z, with in this case two cams 50, for causing metering valves 52 to respond in the sequence of rotational movement. Instead of the cam shaft it is also possible for the same purpose to provide an eccentrically supported disk.

This procedure involving the pulsed discharge of metered quantities of relatively small amounts at a high number in a given unit of time provides for a high level of statistical accuracy in terms of the individual quantums and the total amount in the unit of time.

The metering chambers 14, 14$_a$, 14$_b$ should be of a diameter d of between 0.5 and 100 mm—preferably between 1 and 80 mm—and the length h should be between 5 and 30 times the diameter d, preferably between 10 and 20 times. Emptying and filling of the metering chambers 14, 14$_a$, 14$_b$ is effected in a pulse frequency or rate of between 0.1 and 5 seconds, preferably between 0.2 and 4 seconds. A larger amount of the powder product can be metered or conveyed, depending on the respective number of metering chambers 14, 14$_a$, 14$_b$.

The metering pump 10, 10$_m$ according to the invention is suitable for conveying very small and also large amounts of the powder products which are conveyed in a metered continuously pulsating fashion or—when additionally using a compensating apparatus—in a continuously flowing fashion.

Some examples of use for the metering apparatus 10, 10$_m$ are set forth hereinafter.

EXAMPLE 1

For the production of artificial rubies for the timepiece industry, it was necessary to convey an aluminum oxide powder with a grain distribution of about 5 $\mu$m with a high degree of accuracy into the hydrogen-oxygen flame in which it was to be continuously fused. The amount which is required for that procedure and which has to be supplied to the flame with a respective pulse of 0.5 second was between 5 and 20 mg. The production procedure for a finished ruby lasted between 3 and 5 hours. The metering unit used for that purpose has three metering chambers 14, 14$_a$, 14$_b$.

EXAMPLE 2

For producing infant food, the base material had to be introduced into a glass from a box or can containing 15 g +/−5%. A metering apparatus with six metering chambers 14, 14$_a$ through 14$_e$ was used for the filling operation. In one hour, 36,000 doses were introduced into the various glasses. The pulse time per dose was 0.1 second.

EXAMPLE 3

A tungsten carbide/cobalt powder was to be continuously fed to a plasma torch for thermal spraying, with a conveyor delivery of 150 g/min. The conveyor unit 10$_m$ has three metering chambers 14, 14$_a$, 14$_b$ each with a respective filling weight of 1.25 g, the pulse time was 0.32 second.

EXAMPLE 4

30 m$^3$ was to be conveyed or metered in a mill. A dose was 16 dm$^3$. The metering unit had five metering chambers 14, 14$_a$ through 14$_d$ and the pulse time was 0.5 second.

What is claimed is:

1. A method of pneumatically conveying powder substances in a pipe system, comprising the steps of sucking with reduced pressure a volume of said powder substances into said pipe system comprising a metering chamber to fill said metering chamber and discharging said volume with increased pressure; metering said volume of said powder substance in said metering chamber; and alternately performing said sucking in and said discharging of said volume to and from said pipe system by way of a control member.

2. The method of claim 1 further comprising the steps of closing a suction conduit and a gas pressure conduit.

3. The method of claim 1 comprising the further step of clamping off a plurality of feed hoses comprised of elastic material for vacuum and increased pressure.

4. The method of claim 1 wherein said reduced pressure is between 10 and 600 mbar.

5. The method of claim 1 wherein said increased pressure is between 01 and 6 bars.

6. The method of claim 1 wherein a control pulse for a piston of the control member, controls deformable feed and discharge conduits which closes in very short control pulse times.

7. The method of claim 1 wherein a plurality of metering valves are actuated by means of said control member.

8. The method of claim 1 further comprising a plurality of control pulses for sucking in and discharging said powder substances at a frequency of between 0.1 and 5 seconds.

9. The method of claim 1 comprising the additional step of conveying said powder substances under a protective gas.

10. The method of claim 1 wherein said reduced pressure is between 20 and 500 mbar.

11. The method of claim 1 wherein said increased pressure is between 02 and 5 bars.

* * * * *